(12) United States Patent
Krishnamurthy

(10) Patent No.: US 10,700,893 B1
(45) Date of Patent: Jun. 30, 2020

(54) MULTI-HOMED EDGE DEVICE VXLAN DATA TRAFFIC FORWARDING SYSTEM

(71) Applicant: Dell Products L.P., Round Rock, TX (US)

(72) Inventor: Karthik Krishnamurthy, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/265,586

(22) Filed: Feb. 1, 2019

(51) Int. Cl.
*H04L 12/24* (2006.01)
*H04L 12/46* (2006.01)
*H04L 29/06* (2006.01)

(52) U.S. Cl.
CPC ...... *H04L 12/4633* (2013.01); *H04L 12/4641* (2013.01); *H04L 69/16* (2013.01)

(58) Field of Classification Search
CPC ............. H04L 12/4633; H04L 12/4641; H04L 61/103; H04L 61/6022
See application file for complete search history.

(56) References Cited

U.S. PATENT DOCUMENTS

2013/0318219 A1* 11/2013 Kancherla ............... H04L 49/70
709/222

* cited by examiner

*Primary Examiner* — Jamal Javaid
(74) *Attorney, Agent, or Firm* — Haynes and Boone, LLP

(57) ABSTRACT

A multi-homed edge device VxLAN data traffic forwarding system includes a first VTEP device that receives an Ethernet packet from a first edge device, encapsulates the Ethernet packet in a VxLAN packet, generates a source port value, and provides the source port value in a field in the VxLAN packet. The first VTEP device transmits multiple copies of the VxLAN packet to second VTEP devices that each determine whether the source port value in their respective copy of the VxLAN packet is included in a forwarding range for that second VTEP device that is different than forwarding range(s) for each of the other second VTEP device(s). If not, that second VTEP device prevents information in that copy of the VxLAN packet from being transmitted to the second edge device. If so, that second VTEP device transmits information in that copy of the VxLAN packet to the second edge device.

20 Claims, 12 Drawing Sheets

US 10,700,893 B1

MULTI-HOMED EDGE DEVICE VXLAN DATA TRAFFIC FORWARDING SYSTEM

BACKGROUND

The present disclosure relates generally to information handling systems, and more particularly to forwarding data traffic in a multi-homed information handling system in a VxLAN.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes used to provide a virtual extensible Local Area Network (VxLAN) using network virtualization technology that utilizes a virtual LAN (VLAN)-like encapsulation technique to encapsulate Open Systems Interconnect (OSI) layer 2 Ethernet frames with layer 4 User Datagram Protocol (UDP) datagrams, which can provide enhanced scalability for cloud computing environments and well as other benefits known in the art. VxLAN endpoint devices included in the VxLAN are referred to as VxLAN Tunnel EndPoint (VTEP) devices that operate to terminate VxLAN tunnels provided through the VxLAN, and may be provided by physical or virtual switch devices. Edge devices such as, for example, Provider Edge (PE) devices and Customer Edge (CE) devices, couple to the VxLAN and may transmit data traffic via the VTEP devices to each other. However, the transmission of data traffic from the VxLAN to edge devices can raise some issues.

For example, some CE devices may be provided in a multi-homing configuration (e.g., using Border Gateway Protocol (BGP) Ethernet Virtual Private Network (EVPN) multi-homing techniques) with multiple VTEP devices that are each connected that CE device and that operate together as a single device (e.g., a single switch device) in order to provide redundancy and/or other benefits known in the art. In such multi-homing configurations, data traffic such as Broadcast, Unknown Unicast, and Multicast (BUM) data traffic received by the VTEP devices in the multi-homing configuration can result in the VTEP devices providing duplicate traffic to the CE device. Conventional solutions to this issue include BGP EVPN techniques such as using Type 4 Ethernet Segment Routing to elect one of the VTEP devices as a designated forwarder for the BUM data traffic, while having the remaining VTEP devices block that BUM data traffic (i.e., those VTEP devices receive that BUM data traffic but do not forward it to the CE device.) However, such solutions result in a relatively high bandwidth utilization on the link between the designated forwarder VTEP device and the CE device, along with a relatively low bandwidth utilization on the links between the other VTEP devices and the CE device. Such relatively high bandwidth utilization on the link between the designated forwarded VTEP device and the CE device can result in data traffic packet dropping, particularly when that link has relatively high bandwidth utilization for other data traffic.

Accordingly, it would be desirable to provide an improved multi-homed edge device VxLAN data traffic forwarding system.

SUMMARY

According to one embodiment, an Information Handling System (IHS) includes a processing system; and a memory system that is coupled to the processing system and that includes instructions that, when executed by the processing system, cause the processing system to provide a forwarding engine that is configured to: receive, through a network from a first Virtual Extensible Local Area Network (VxLAN) Tunnel EndPoint (VTEP) device, a copy of a VxLAN data packet that encapsulates an Ethernet data packet and includes a source port field having a source port value that was generated using information in the Ethernet data packet; determine whether the source port value in the source port field in the copy of the VxLAN data packet is included in a forwarding range that provides for forwarding of VxLAN data packets by the forwarding engine to an edge device, and that is different than at least one respective forwarding range that provides for forwarding of VxLAN data packets to the edge device by at least one respective second VTEP device that is coupled to the edge device; prevent, in response to the source port value in the source port field in the copy of the VxLAN data packet not being included in the forwarding range, information in the copy of the VxLAN data packet from being transmitted to the edge device; and transmit, in response to the source port value in the source port field in the copy of the VxLAN data packet being included in the forwarding range, information in the copy of the VxLAN data packet to the edge device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
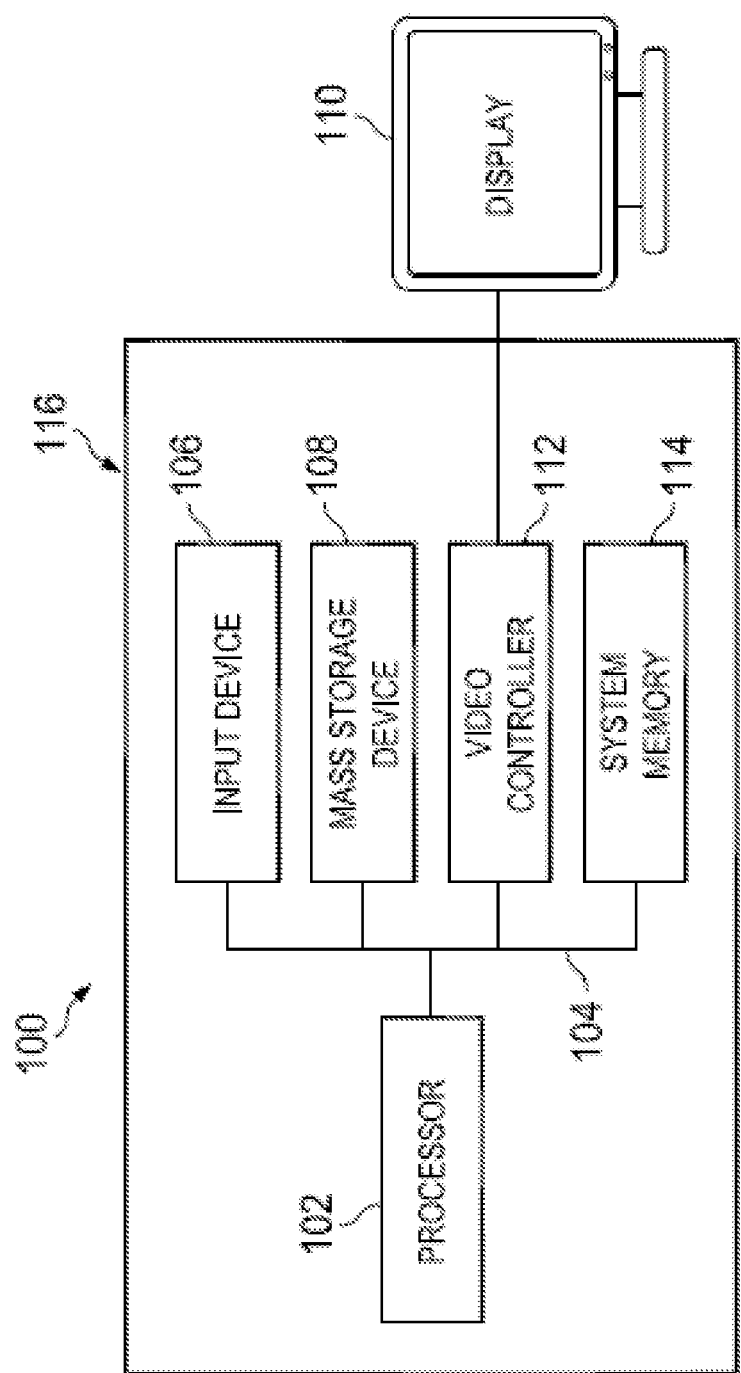
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
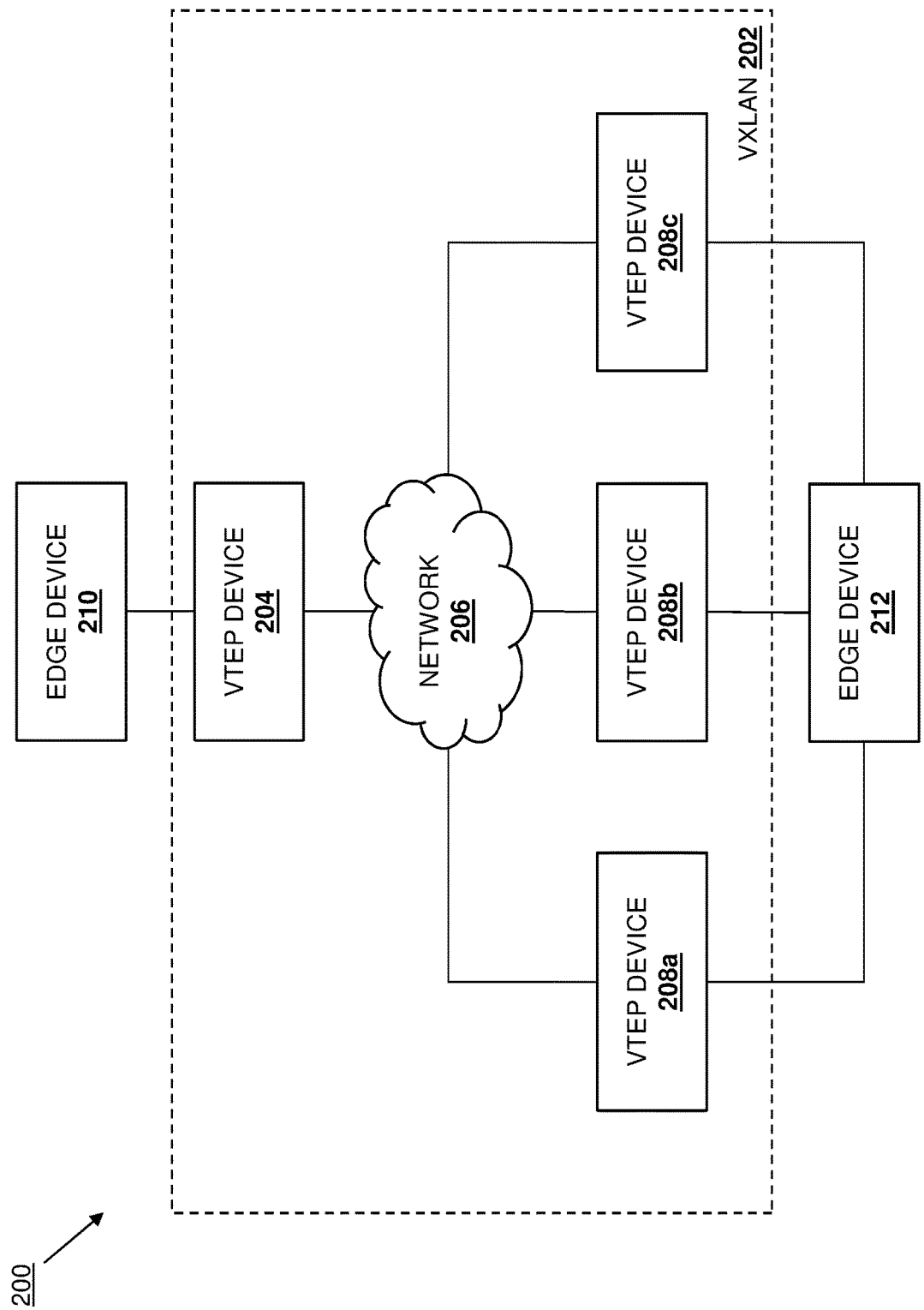
FIG. 2 is a schematic view illustrating an embodiment of a multi-homed edge device Virtual Extensible Local Area Network (VxLAN) data traffic forwarding system.

Referring now to FIG. 2, an embodiment of a multi-homed edge device Virtual Extensible Local Area Network (VxLAN) data traffic forwarding system 200 is illustrated. In the illustrated embodiment, the multi-homed edge device VxLAN data traffic forwarding system 200 includes a VxLAN 202 that, in the illustrated embodiment, includes a VxLAN Tunnel EndPoint (VTEP) device 204 that may be provided by the IHS 100 discussed above with reference to FIG. 1 and/or may include some or all of the components of the IHS 100. In a specific example, the VTEP device 204 may be provided by a switch device, but any other device capable of performing the functionality of the VTEP devices discussed below will fall within the scope of the present disclosure as well. In the examples discussed below, the VTEP device 204 provides a source VTEP device that encapsulates Ethernet data packets transmitted by first edge devices in VxLAN data packets in the manner discussed in further detail below, and transmits those VxLAN data packets through the VxLAN 202 for provisioning to second edge devices. However, while a single source VTEP device is provided in the examples below, one of skill in the art in possession of the present disclosure will recognize that VxLANs may include a plurality of source VTEP devices while remaining within the scope of the present disclosure as well.

In the illustrated embodiment, the VxLAN 202 also includes a network 206 that is coupled to the VTEP device 204 and that may be provided by one or more of a variety of networking devices that would be apparent to one of skill in the art in possession of the present disclosure. In a specific example, the network 206 may be a Layer 3 (L3) overlay network which one of skill in the art in possession of the present disclosure will recognize is an L3 network that is built on top of another network, and may include nodes (e.g., the networking devices that provide the network 206) that are connected by virtual or logical links, each of which may correspond to a path through the L3 network and may be provided though many physical links in the underlying network. However, while a specific network 206 has been described, one of skill in the art will recognize that other types of networks that allow for the functionality discussed below will fall within the scope of the present disclosure as well. Furthermore, while VTEP devices providing VxLAN tunnels are described in the examples below, one of skill in the art in possession of the present disclosure will recognize that the teachings of the present disclosure may benefit other tunneling technology (e.g., GEneric NEtwork Virtualization Encapsultion (GENEVE) tunneling technology) while remaining within the scope of the present disclosure as well.

In the illustrated embodiment, the VxLAN 202 also includes a plurality of VTEP devices 208a, 208b, and 208c, any or all of which may be provided by the IHS 100 discussed above with reference to FIG. 1 and/or may include some or all of the components of the IHS 100. In a specific example, each of the VTEP devices 208a-c may be provided by a switch device, but any other device capable of performing the functionality of the VTEP devices discussed below will fall within the scope of the present disclosure as well. In the illustrated embodiment, an edge device 210 is coupled to the VxLAN 202 via a connection to the VTEP device 204. In an embodiment, the edge device 210 may be provided by the IHS 100 discussed above with reference to FIG. 1 and/or may include some or all of the components of the IHS 100. In a specific example, the edge device 210 may be provided by a Provider Edge (PE) device, although one of skill in the art in possession of the present disclosure will recognize that other edge devices may provide Ethernet data traffic to the VTEP device 204 in the manner discussed below while remaining within the scope of the present disclosure as well.

In the illustrated embodiment, an edge device 212 is coupled to the VxLAN 202 via respective connections to each of the VTEP devices 208a, 208b, and 208c. In an embodiment, each of the edge device 212 may be provided by the IHS 100 discussed above with reference to FIG. 1 and/or may include some or all of the components of the IHS 100. In a specific example, the edge device 212 may be provided by a Customer Edge (CE) device, although one of skill in the art in possession of the present disclosure will recognize that other edge devices may receive the VxLAN data traffic from the VTEP devices 208a, 208b, and/or 208c in the manner discussed below while remaining within the scope of the present disclosure as well. One of skill in the art in possession of the present disclosure will recognize that the VTEP devices 208a-c and the edge device 212 are provided in a multi-homing configuration in FIG. 2, which as discussed above may be provided using Border Gateway Protocol (BGP) Ethernet Virtual Private Network (EVPN) multi-homing techniques, and configures the VTEP devices 208a-c to operate together as a single device (e.g., a single switch device) that provide data traffic to the edge device 212 in order to provide redundancy and/or other benefits known in the art. However, while a specific multi-homed edge device VxLAN data traffic forwarding system 200 is illustrated and described herein, one of skill in the art in possession of the present disclosure will recognize that VxLANs and the edge devices coupled to them may be provided by a variety of components and/or component configurations while remaining within the scope of the present disclosure as well.

Figure 3:
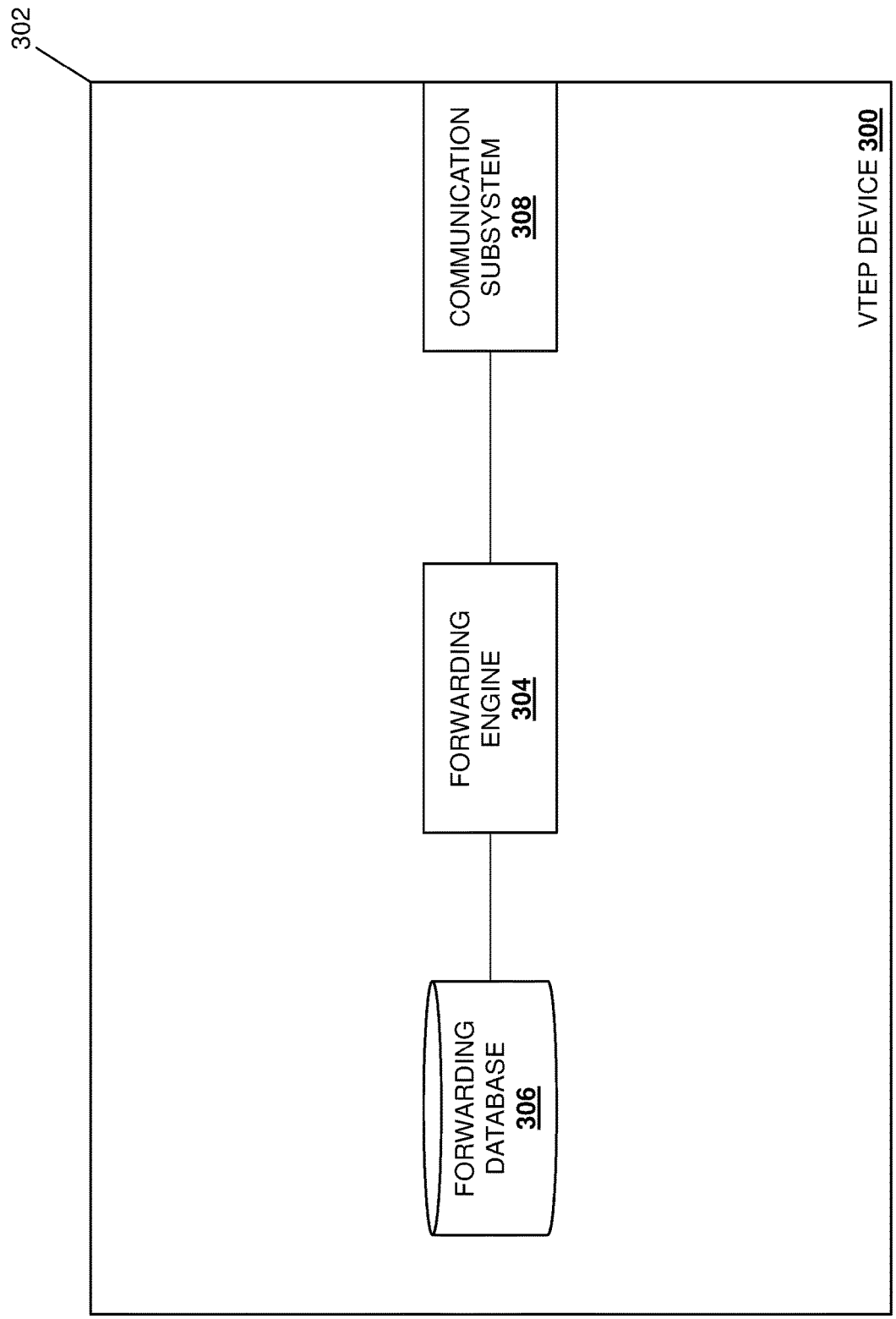
FIG. 3 is a schematic view illustrating an embodiment of a VxLAN Tunnel EndPoint (VTEP) device that may be provided in the multi-homed edge device VxLAN data traffic forwarding system of FIG. 2.

Referring now to FIG. 3, an embodiment of a VTEP device 300 is illustrated that may provide any of the VTEP devices 202 and 208a-c discussed above with reference to FIG. 2. As such, the VTEP device 300 may be provided by the IHS 100 discussed above with reference to FIG. 1 and/or may include some or all of the components of the IHS 100, and in specific examples may be provided by a switch device. In the illustrated embodiment, the VTEP device 300 includes a chassis that houses the components of the VTEP device 300, only some of which are illustrated in FIG. 3. For example, the chassis 302 may house a processing system (not illustrated, but which may include the processor 102 discussed above with reference to FIG. 1) and a memory system (not illustrated, but which may be provided by the member 114 discussed above with reference to FIG. 1) that is coupled to the processing system and that includes instructions that, when executed by the processing system, cause the processing system to provide a forwarding engine 304 that is configured to perform the functionality of the forwarding engines and VTEP devices discussed below.

The chassis 302 may also house a storage system (not illustrated, but which may include the storage 108 discussed above with reference to FIG. 1) that is coupled to the forwarding engine 304 (e.g., via a coupling between the storage system and the processing system) and that includes a forwarding database 306 that is configured to store any of the information utilized by the forwarding engine 304 as discussed below. In a specific example, implementations of the forwarding engine 304 and forwarding database 306 may include Access Control Lists (ACLs) provided in platforms available from BROADCOM® Inc. of San Jose, Calif., United States, which one of skill in the art in possession of the present disclosure will recognize allow the matching of the ranges of UDP source port values to particular UDP source port values discussed below using the ACLs. The chassis 302 also houses a communication subsystem 308 that is coupled to the forwarding engine 304 (e.g., via a coupling between the communication subsystem 308 and the processing system) and that may include a Network Interface Controller (NIC), wireless communication subsystems (e.g., a BLUETOOTH® communication subsystem, a Near Field Communication (NFC) communication subsystem, a WiFi communication subsystem, etc.), and/or any other communication components that would be apparent to one of skill in the art in possession of the present disclosure. While a specific VTEP device 300 is illustrated and described in FIG. 3, one of skill in the art in possession of the present disclosure will recognize that VTEP devices may include a variety of components and/or component configurations for performing conventional VTEP functionality, as well as the functionality discussed below, while remaining within the scope of the present disclosure as well.

Figure 4:
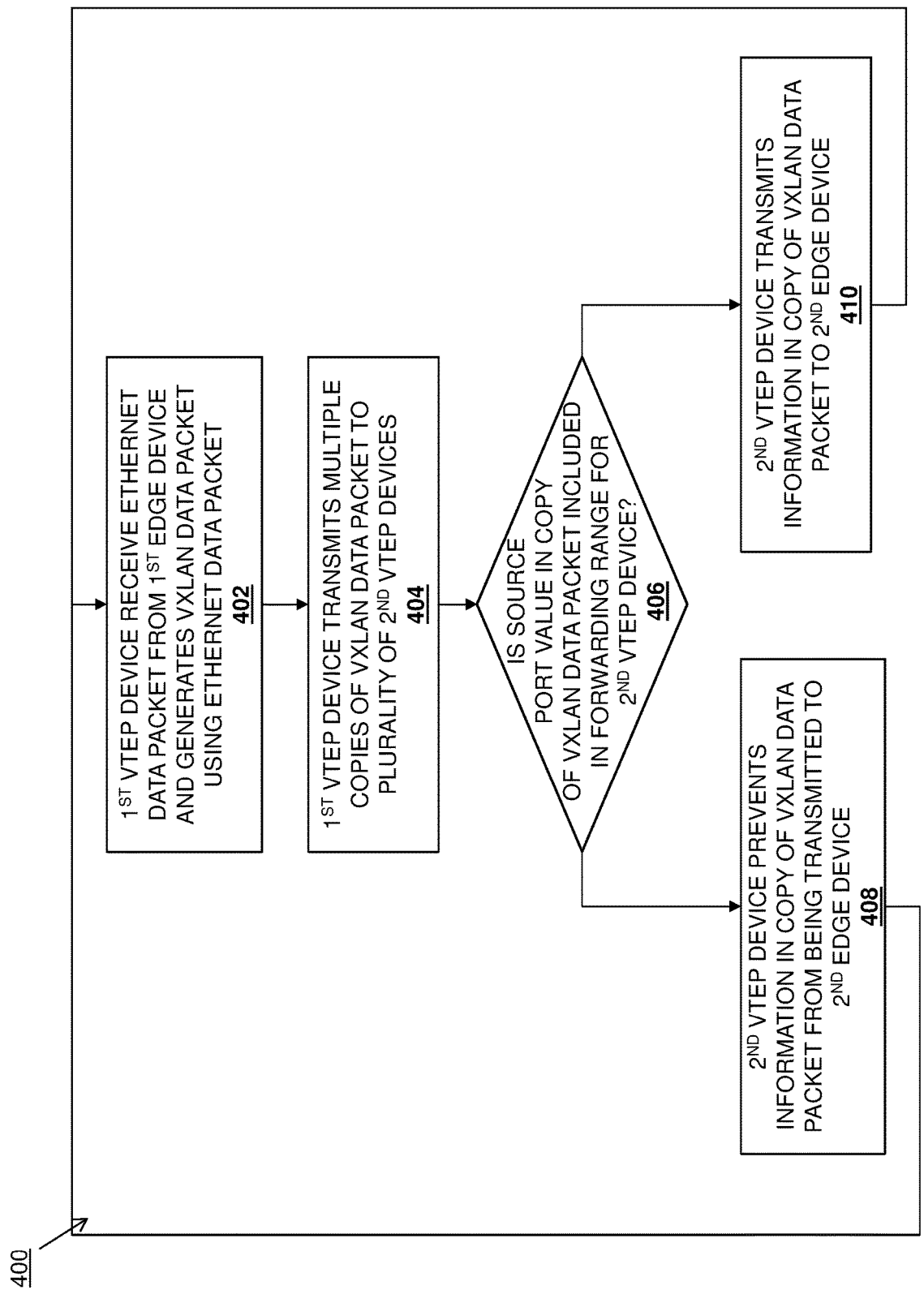
FIG. 4 is a flow chart illustrating an embodiment of a method for forwarding VxLAN traffic to a multi-homed edge device in a VxLAN.

Referring now to FIG. 4, an embodiment of a method 400 for forwarding VxLAN traffic to a multi-homed edge device in a VxLAN is illustrated. As discussed below, the systems and methods of the present disclosure provide for the forwarding one of a plurality of copies of any particular VxLAN data packet over time to an edge device using different multi-homed VTEP devices that are provided in a multi-homed configuration with the edge device. As discussed below, the systems and methods of the present disclosure may take advantage of the conventional generation of VxLAN data packets by a source VTEP in which the source VTEP device encapsulates an Ethernet data packet in a VxLAN data packet and performs a hashing operation on information included in the Ethernet data packet (e.g., the inner packet information provided by the Ethernet data packet) in order to generate a hashed value, and then provides that hashed value as a UDP source port value in a UDP source port field of a UDP header in the VxLAN data packet. As such, when copies of a particular VxLAN packet are forwarded through a network by the source VTEP device and received by each of the multi-homed VTEP devices, each of those copies of that VxLAN data packet will include that UDP source port value, and different Ethernet packets encapsulated in VxLAN data packets by the source VTEP device will result in different UDP source port values in those VxLAN data packets.

Each of the multi-homed VTEP devices will compare the UDP source port value in any copy of a received VxLAN data packet to a forwarding range for that multi-homed VTEP device that is different than respective forwarding ranges for the other multi-homed VTEP devices (e.g., each multi-homed VTEP device may have a forwarding range that is a different potion of the range of UDP source port values available for the UDP source port field in the UDP header), and determine whether that UDP source port value falls within its forwarding range. If so, that VTEP device will forward that VxLAN data packet to the edge device in the multi-homed configuration and, if not, that VTEP device will block that VxLAN data packet from being forwarded to the edge device in the multi-homed configuration. As such, different VxLAN data packets generated by the source VTEP device will have different UDP source port values, which will result in different ones of the multi-homed VTEP devices forwarding a single copy of any particular VxLAN data packet to the edge device while the other multi-homed VTEP devices block their copies of that VxLAN data packet from being forwarding to the edge device, thus distributing the forwarding of VxLAN data packets to the edge device across different ones of the multi-homed VTEP devices over time.

Figure 6A:
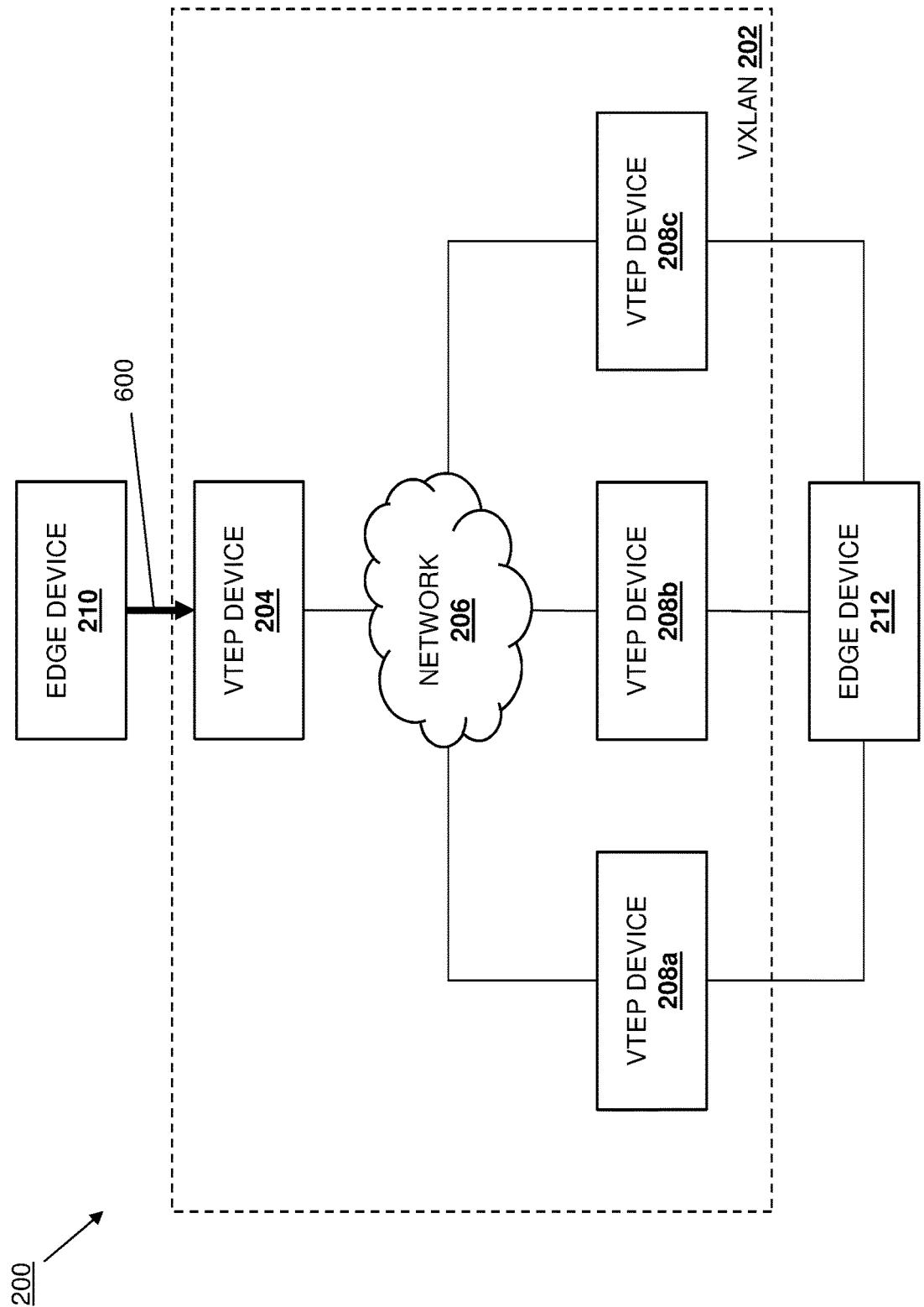
FIG. 6A is a schematic view illustrating an embodiment of the transmission of data traffic in the multi-homed edge device VxLAN data traffic forwarding system of FIG. 2 during the method of FIG. 4.

The method 400 begins at block 402 where a first VTEP device receives an Ethernet data packet from a first edge device and generates a VxLAN data packet using the Ethernet data packet. With reference to FIG. 6A, in an embodiment of block 402, the edge device 210 (e.g., a PE device in this example) generates an Ethernet data packet and transmits the Ethernet data packet to the VTEP device 204 (e.g., a source VTEP device in this example), as illustrated by element 600. In an embodiment, the Ethernet data packet generated and transmitted by the edge device 210 at block 402 may be part of Broadcast, unknown Unicast, and Multicast (BUM) data traffic that one of skill in the art in possession of the present disclosure will recognize may be provided by network data traffic that is forwarded to multiple destinations and/or that cannot be addressed to the intended destination device only. However, one of skill in the art in possession of the present disclosure will recognize that any network data traffic that may be provided to multiple multi-homed VTEP devices for provisioning to a corresponding multi-homed edge device will fall within the scope of the present disclosure as well.

Figure 5A:
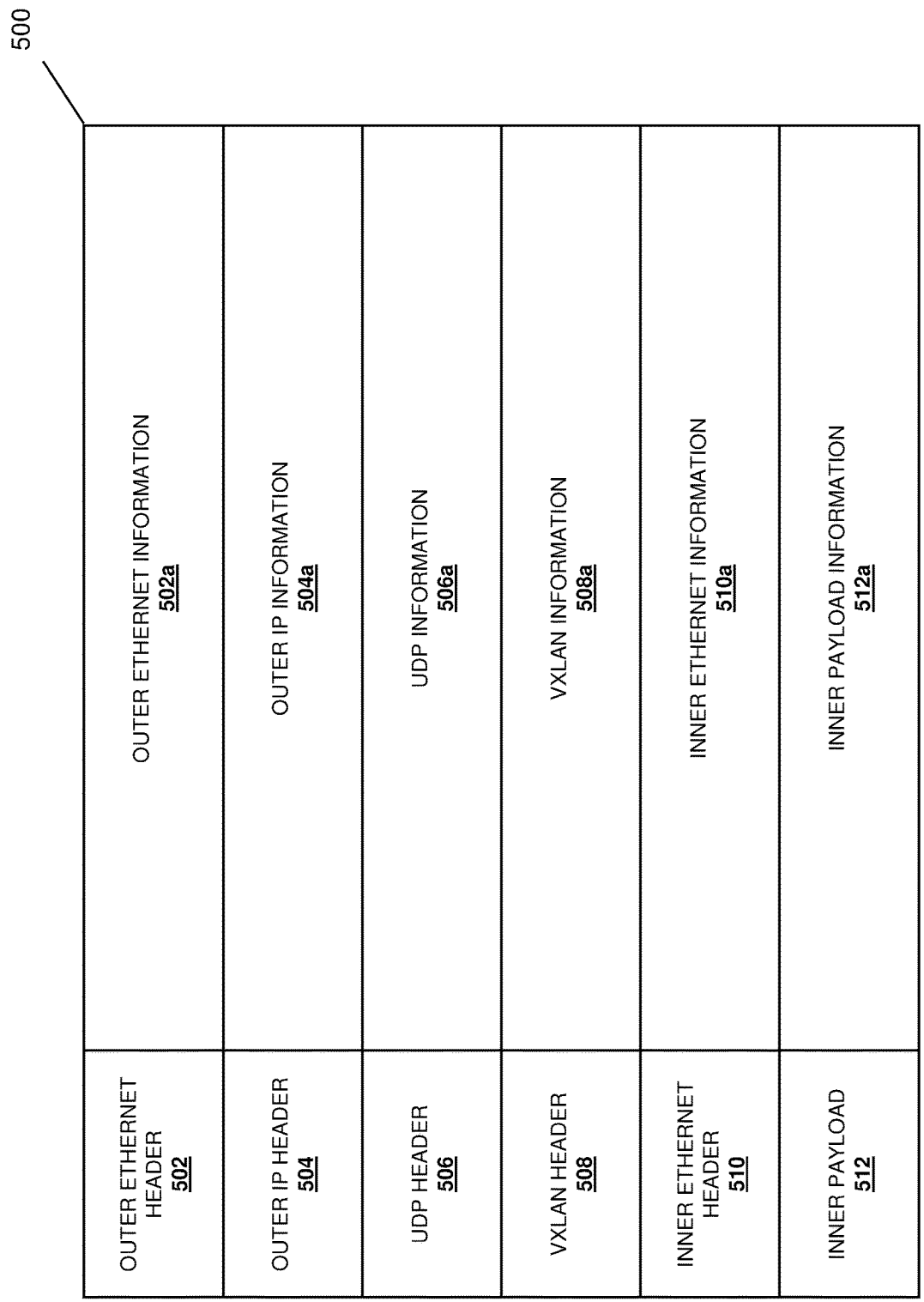
FIG. 5A is a schematic view illustrating an embodiment of a VxLAN data packet that may be generated and transmitted during the method of FIG. 4.

As such, at block 402, the forwarding engine 304 in the VTEP device 204 receives the Ethernet data packet transmitted by the edge device 210 via its communication subsystem 308. As discussed below, the VTEP device 204 in this example operates as a source VTEP device and, as such, at block 402 the forwarding engine 304 in the VTEP device 204 will operate to use the Ethernet data packet to generate a VxLAN data packet for transmission through the VxLAN 202 for provisioning to the edge device 212 (e.g., a CE device in this example). For example, the generation of the VxLAN data packet at block 402 may include encapsulating the Ethernet data packet in a VxLAN data packet, generating a source port value using information included in the Ethernet data packet, providing that source port value in a source port field in the VxLAN data packet, and/or any other VxLAN data packet generation techniques that would be apparent to one of skill in the art in possession of the present disclosure. Referring now to FIG. 5A, an embodiment of a VxLAN data packet 500 is illustrated. In the illustrated embodiment, the VxLAN data packet 500 includes an outer Ethernet head 502 having outer Ethernet information 502a, an outer Internet Protocol (IP) header 504 including outer IP information 504a, a User Datagram Protocol (UDP) header 506 including UDP information 506a, a VxLAN header 508 including VxLAN information 508a, an inner Ethernet header 510 including inner Ethernet information 510a, and an inner payload 512 including inner payload information 512a.

Figure 5B:
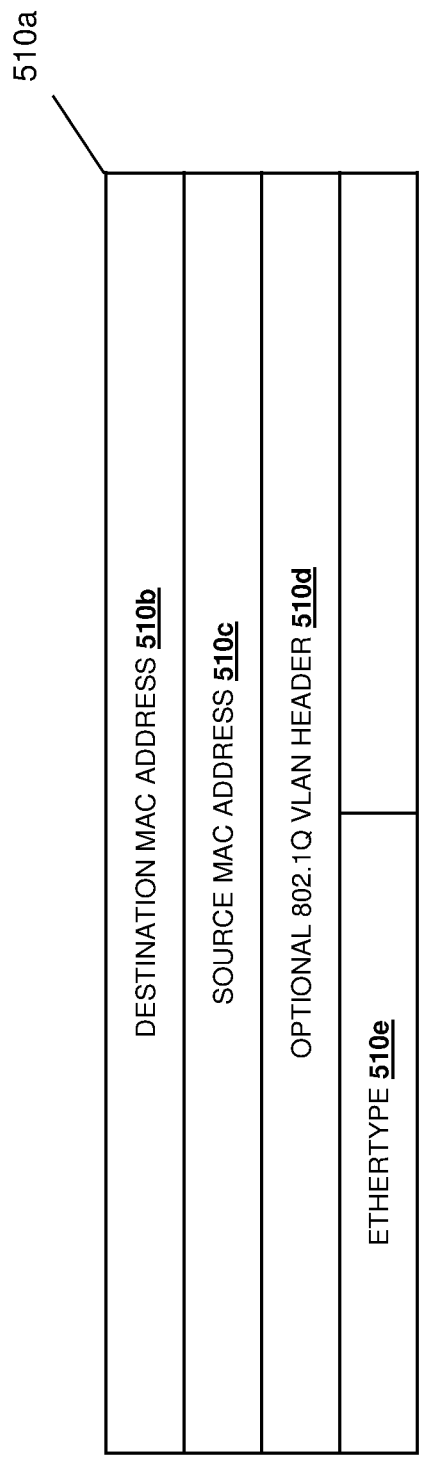
FIG. 5B is a schematic view illustrating an embodiment of inner Ethernet information that may be included in the VxLAN data packet of FIG. 5A.

Referring next to FIG. 5B, an embodiment of the inner Ethernet information 510a is illustrated that includes a destination Media Access Control (MAC) address field 510b, a source MAC address field 510c, an optional 802.1Q VLAN header field 510d, and an Ethertype field 510e. In an embodiment of block 402, the forwarding engine 304 in the VTEP device 204 may use any, all, or any combination of the values included in the fields of the inner Ethernet information 510a illustrated in FIG. 5B in order to generate the source port value discussed above. Furthermore, in some embodiments, the forwarding engine 304 in the VTEP device 204 may use any, all, or any combination of data included in the inner Ethernet information 510a, the payload information 512a, and the inner payload 512 (e.g., IP headers, non-IP headers, etc.) illustrated in FIG. 5A in order to generate the source port value discussed above. However, while specific information from the Ethernet data packet has been illustrated and described as being included in the VxLAN data packet 500, one of skill in the art in possession of the present disclosure will recognize that a variety of information from an Ethernet data packet may be utilized to generate the source port value discussed below while remaining within the scope of the present disclosure as well.

Figure 5C:
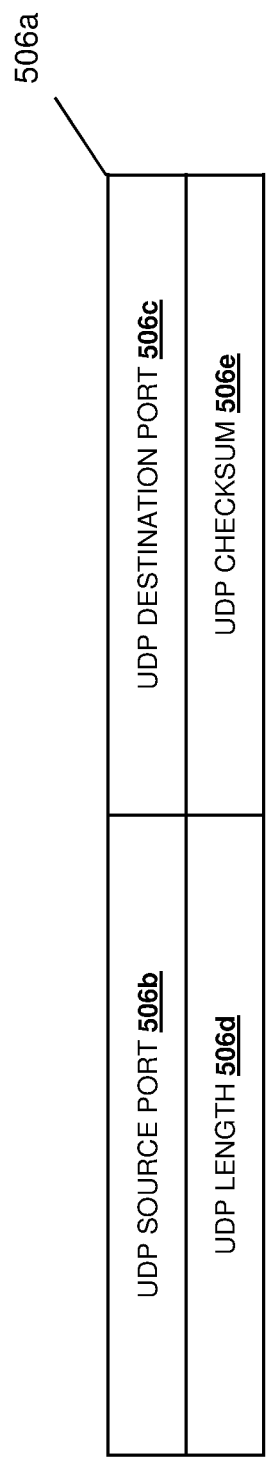
FIG. 5C is a schematic view illustrating an embodiment of User Datagram Protocol (UDP) information that may be included in the VxLAN data packet of FIG. 5A

In a specific example, at block 402, the forwarding engine 304 in the VTEP device 204 may perform a hashing operation on any, all, or any combination of the values included in the fields of the inner Ethernet information 510a in order to generate the source port value, and one of skill in the art in possession of the present disclosure will recognize that the source port value generated via the hashing operation performed on the information included in the Ethernet data packet (i.e., in the fields of the inner Ethernet information 510a and/or inner payload information 512a) will change as that information changes. However, while a hashing operation has been discussed as being performed on the information included in the Ethernet data packet in order to generate source port values, other techniques for generating different source port values based on different Ethernet data packet information will fall within the scope of the present disclosure as well. Referring now to FIG. 5C, an embodiment of the UDP information 506a is illustrated that includes a UDP source port field 506b, a UDP destination port field 506c, a UDP length field 506d, and a UDP checksum field 506e. In an embodiment, at block 402, the forwarding engine 304 in the VTEP device 204 may provide the source port value (e.g., generated via the hashing operation performed on the Ethernet data packet information as discussed above) in the UDP source port field 506b in order to provide a UDP source port value in that UDP source port field 506b.

As would be understood by one of skill in the art in possession of the present disclosure, the VxLAN RFC 7348 available from the Internet Engineering Task Force (IETF) recommends that the UDP source port number (i.e., the UDP source port value discussed above) be calculated using a hash of the fields in the inner packet, one specific example being the hash of the inner Ethernet frame's headers, which is intended to enable a level of entropy for the Equal Cost Multi-Path/load balancing of the Virtual Machine (VM)-to-VM traffic across the VxLAN overlay (i.e., the network 206). However, as discussed below, the multi-homed edge device VxLAN data traffic forwarding system 200 of the present disclosure may repurpose that UDP source port value to provide for the forwarding of different VxLAN data packets to a multi-homed edge device by different multi-homed VTEP devices. As such, in specific examples, the source port value provided in the UDP source port field 506b may be a UDP source port value in the range between 0 and 65535 (i.e., 65535 being the maximum value available for the UDP source port.) However, while a specific VxLAN data packet 500 has been illustrated and described, one of skill in the art in possession of the present disclosure will recognize that the systems and methods of the present disclosure may utilize different information in an Ethernet data packet and/or the VxLAN data packet that encapsulates that Ethernet data packet in order to provide for the functionality discussed below while remaining within the scope of the present disclosure as well.

Figure 6B:
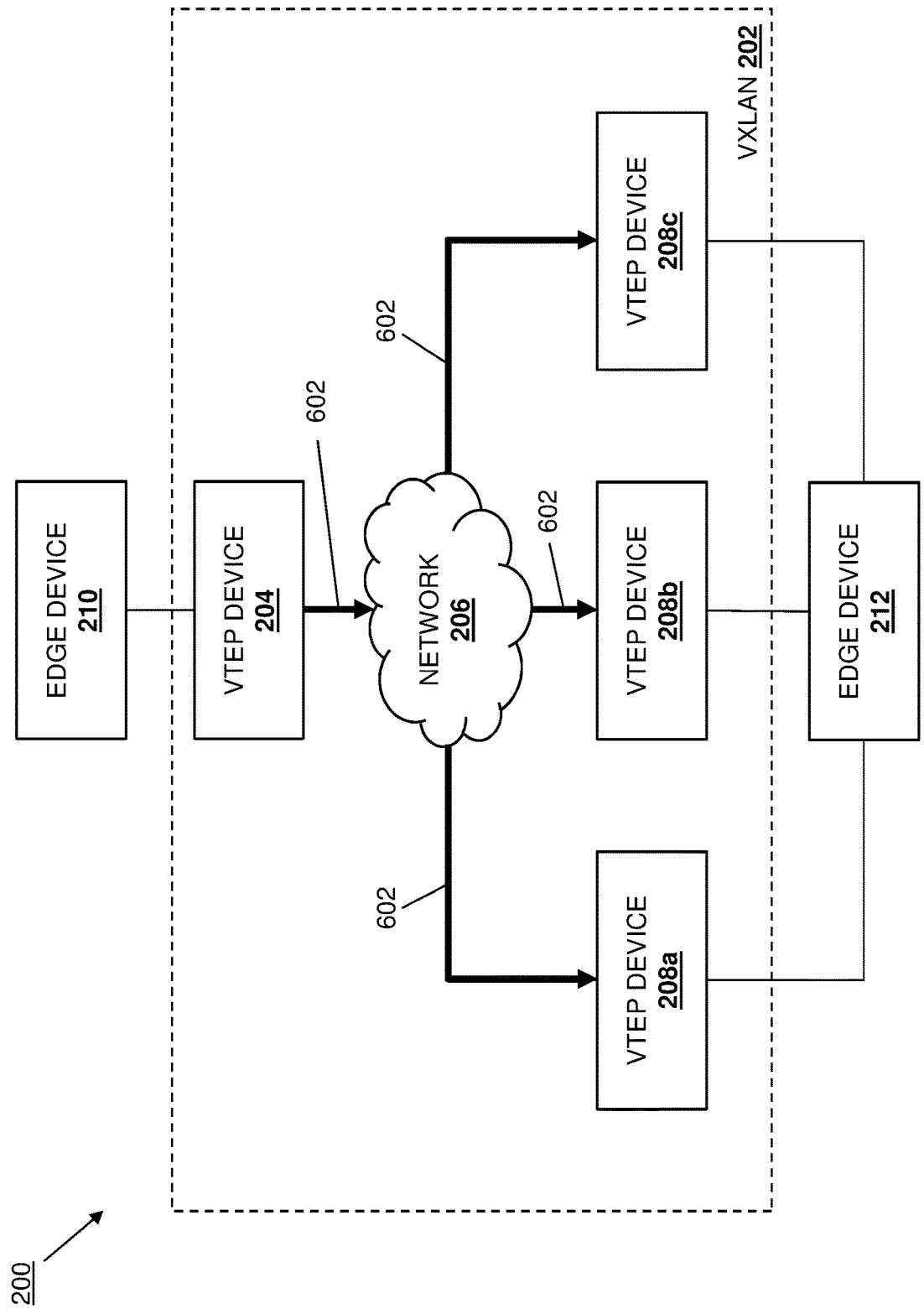
FIG. 6B is a schematic view illustrating an embodiment of the transmission of data traffic in the multi-homed edge device VxLAN data traffic forwarding system of FIG. 2 during the method of FIG. 4.

The method 400 then proceeds to block 404 where the first VTEP device transmits multiple copies of the VxLAN data packet to a plurality of second VTEP devices. With reference to FIG. 6B, in an embodiment of block 404, the forwarding engine 304 in the VTEP device 204 may generate multiple copies of the VxLAN data packet (e.g., the VxLAN data packet 500 discussed above with reference to FIGS. 5A-5C), and transmit different copies of the VxLAN data packet through the network 206 to each of the VTEP devices 208a, 208b, and 208c (e.g., the multi-homed VTEP devices in this example), as illustrated by elements 602. As discussed above, the Ethernet data packet received by the VTEP device 204 at block 402 may be provided as part of BUM traffic and, as such, the VxLAN data packet may be provided as part of BUM traffic as well, requiring the replicating of the VxLAN data packet and transmittal of those multiple copies of that VxLAN data packet through the VxLAN 202 at block 404. However, one of skill in the art in possession of the present disclosure will recognize that multiple copies of the same VxLAN data packet may be transmitted through the VxLAN 202 to different multi-homed VTEP devices for a variety of reasons that will fall within the scope of the present disclosure as well. As such, at block 404, each of the forwarding engines 304 in each of the VTEP devices 208a, 208b, and 208c receives a respective copy of the VxLAN data packet via its respective communication subsystem 308.

The method 400 then proceeds to decision block 406 where each of the second VTEP devices determines whether a source port value in its copy of the VxLAN data packet is included in a forwarding range for that second VTEP device. As such, in the example provided below, decision block 406 and one of blocks 408 and 410 may be performed by each of the VTEP devices 208a, 208b, and 208c for any particular VxLAN data packet that has been copied and received by each of the VTEP devices 208a-c. In an embodiment of decision block 406, the forwarding engine 304 in each multi-homed VTEP device may identify the source port value in the source port field in the copy of the VxLAN data packet it received at block 404, and determine whether that source port value is within a forwarding range for that VTEP device. For example, the forwarding engine 304 in each VTEP device may identify the UDP source port value provided in the UDP source port field 506b in the copy of the VxLAN data packet it received at block 404, and determine whether that UDP source port value is within a forwarding range for that VTEP device.

In some embodiments, each of the VTEP devices 208a, 208b, and 208c may be associated with different forwarding ranges that correspond to different portions of the available range of UDP source port values that may be provided in the UDP source port field 506a included in the UDP information 506a of the UDP header 506 in the VxLAN data packet 500 (e.g., 0-65535, as discussed above.) In some embodiments, the VTEP devices 208a-c may exchange edge device connection communications (e.g., via the network 206) with each other such that each of the VTEP devices 208a-c is aware of the other VTEP devices in the multi-homed configuration with the edge device 212. For example, prior to the method 400, a user or network administrator may have assigned each of the VTEP devices 208a-c (i.e., the multi-homed VTEP devices) a common Ethernet Segment Identifier (ESI) value that indicates that each of those VTEP devices 208a-c are in the multi-homed configuration with the edge device 212. Subsequently, the VTEP devices 208a-c may exchange type 1 Border Gateway Protocol (BGP) Ethernet Virtual Private Network (EVPN) route advertisement communications (e.g., the edge device connection communication discussed above) that include that ESI value, which allows each VTEP device 208a-c to determine the others of those VTEP devices are part of the multi-homed configuration with the edge device 212.

The VTEP devices 208a-c may then divide the different portions of the available range of UDP source port values between each other based on the number to VTEP devices in the multi-homed configuration (e.g., three in this example). For example, the available range of UDP source port values may be divided between the VTEP devices 208a-c based on an ascending order of the IP addresses of the VTEP devices 208a-c, a descending order of the IP addresses of the VTEP devices 208a-c, a Virtual Network IDentifier (VNID) included in the VxLAN information 508a in the VxLAN header 508 in the VxLAN data packet 500, and/or using any other techniques that would be apparent to one of skill in the art in possession of the present disclosure in the art in possession of the present disclosure. In a specific example, the VTEP device 208a may have an IP address "1.1.1.1", the VTEP device 208b may have an IP address "2.2.2.2", and the VTEP device 208c may have an IP address "3.3.3.3", and the dividing of the available range of UDP source port values between the VTEP devices 208a-c based on an ascending order of those IP addresses may result in the forwarding ranges for the VTEP devices 208a-c in the following table:

| VTEP DEVICE | FORWARDING RANGE |
|---|---|
| VTEP DEVICE 208a | 0-24575 |
| VTEP DEVICE 208b | 24576-49151 |
| VTEP DEVICE 208c | 49152-65535 |

However, while specific examples of the association of forwarding ranges with multi-homed VTEP devices has been illustrate and described, one of skill in the art in possession of the present disclosure will recognize that different forwarding ranges may be associated with VTEP devices in a variety of manners that will fall within the scope of the present disclosure as well. In some embodiments, it may be desirable to increase the available source port value range beyond that which is available via the UDP source port field, and other information may be utilized to provide the forwarding ranges for each of the multi-homed VTEP devices. For example, the forwarding ranges may be divided between the VTEP devices 208a-c from the sum of the available range of UDP source port values and a VNID included in the VxLAN data packet (or any other information that one of skill in the art in possession of the present disclosure would recognize would increase the available source port value range.)

If, at decision block 406, a second VTEP device determines that the source port value in its copy of the VxLAN data packet is not included in the forwarding range for that second VTEP device, the method 400 proceeds to block 408 where that second VTEP device prevents information in its copy of the VxLAN data packet from being transmitted to a second edge device. However, if at decision block 406 a second VTEP device determines that the source port value in its copy of the VxLAN data packet is included in the forwarding range for that second VTEP device, the method 400 proceeds to block 410 where that second VTEP device transmits information its copy of the VxLAN data packet to the second edge device (which one of skill in the art in possession of the present disclosure will recognize may include the de-encapsulation of the Ethernet data packet from the VxLAN data packet and transmittal of that Ethernet data packet to the second edge device, transmittal of that VxLAN data packet to the second edge device, de-encapsulation of the Ethernet data packet from the VxLAN data packet and then re-encapsulation of that Ethernet packet in another VxLAN data packet that is transmitted to the second edge device, etc.)

Figure 6C:
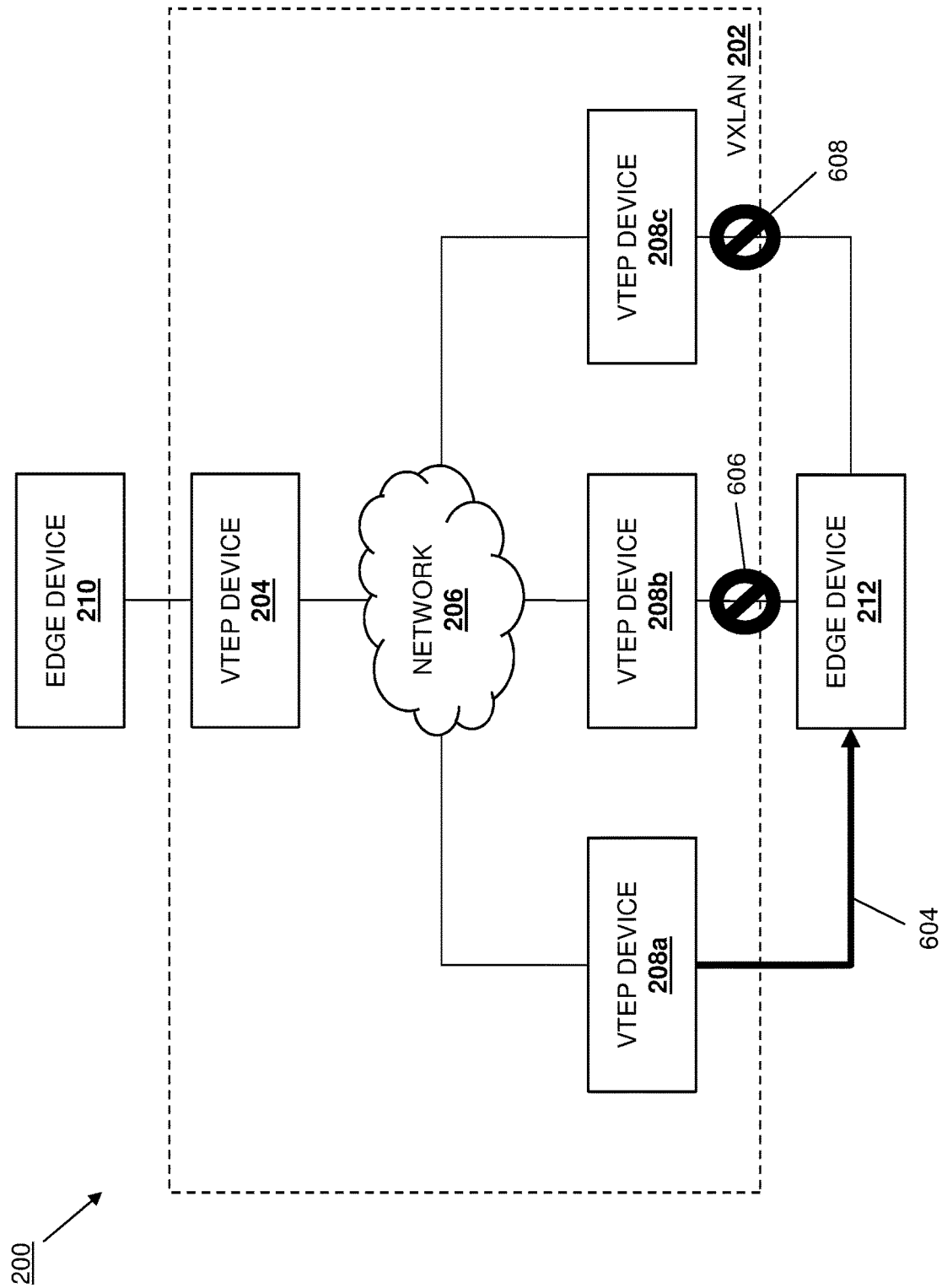
FIG. 6C is a schematic view illustrating an embodiment of the transmission of data traffic in the multi-homed edge device VxLAN data traffic forwarding system of FIG. 2 during the method of FIG. 4.

With reference to FIG. 6C and based on the forwarding ranges included in the table provided in the example above, the UDP source port value that was provided by the VTEP device 202 in the UDP source port field 506b included in the UDP information 506a of the UDP header 506 in each of the copies of a first VxLAN data packet 500 may be "1235". As such, the forwarding engine 304 in the VTEP device 208a will determine that the UDP source port value "1235" falls within its forwarding range ("0-24575") and will forward information in its copy of the first VxLAN data packet to the edge device 212 as indicated by element 604, while the forwarding engine 304 in the VTEP device 208b will determine that the UDP source port value "1235" does not fall within its forwarding range ("24576-49151") and will block information in its copy of the first VxLAN data packet from being transmitted to the edge device 212 as indicated by element 606, and the forwarding engine 304 in the VTEP device 208c will determine that the UDP source port value "1235" does not fall within its forwarding range ("49152-65535") and will block information in its copy of the first VxLAN data packet from being transmitted to the edge device 212 as indicated by element 608.

Figure 6D:
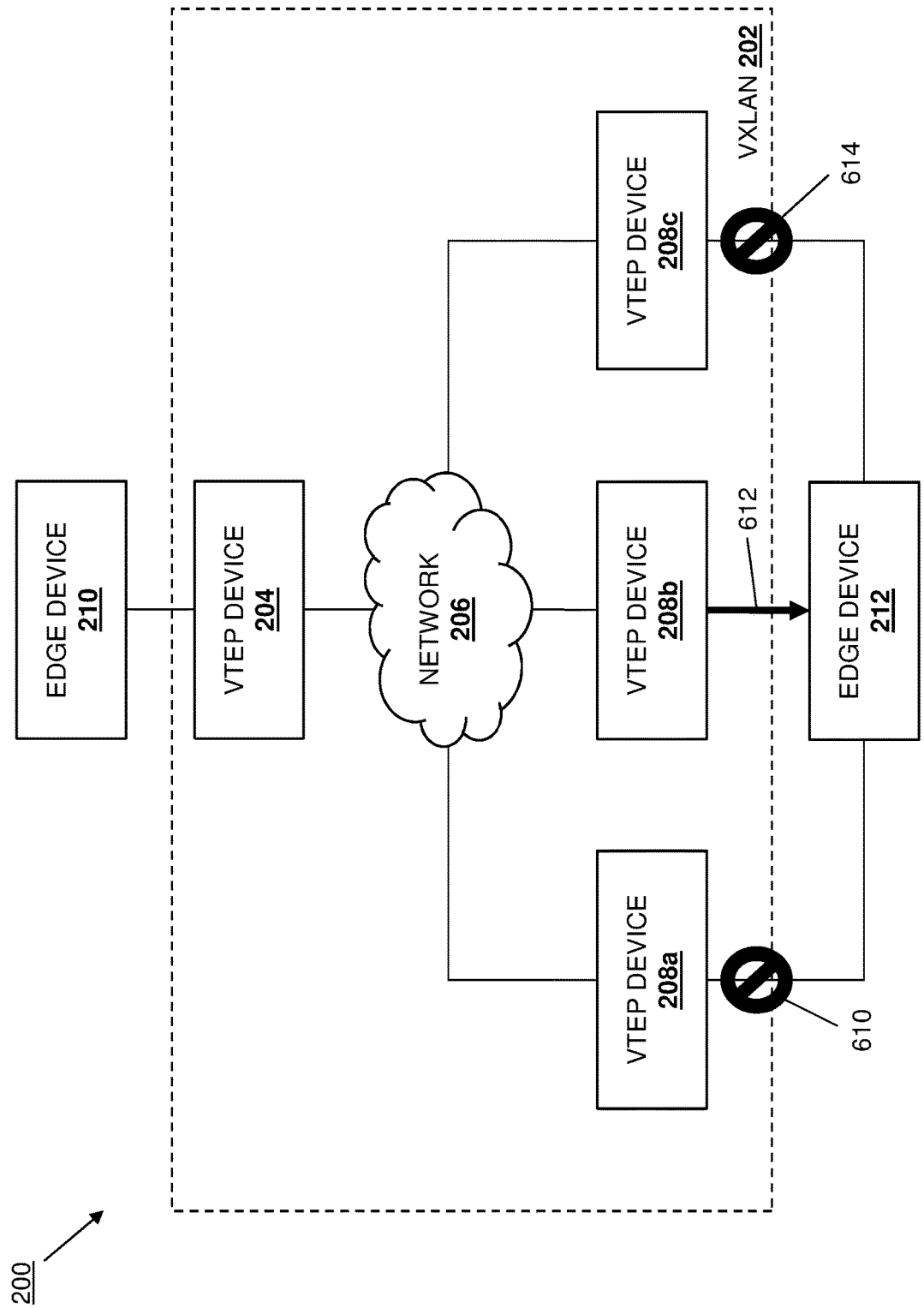
FIG. 6D is a schematic view illustrating an embodiment of the transmission of data traffic in the multi-homed edge device VxLAN data traffic forwarding system of FIG. 2 during the method of FIG. 4.

With reference to FIG. 6D, and based on the forwarding ranges included in the table provided in the example above, the UDP source port value that was provided by the VTEP device 202 in the UDP source port field 506b included in the UDP information 506a of the UDP header 506 in each of the copies of a second VxLAN data packet 500 may be "35200". As such, the forwarding engine 304 in the VTEP device 208a will determine that the UDP source port value "35200" does not fall within its forwarding range ("0-24575") and will block information in its copy of the second VxLAN data packet from being transmitted to the edge device 212 as indicated by element 610, while the forwarding engine 304 in the VTEP device 208b will determine that the UDP source port value "35200" falls within its forwarding range ("24576-49151") and will forward information in its copy of the second VxLAN data packet to the edge device 212 as indicated by element 612, and the forwarding engine 304 in the VTEP device 208c will determine that the UDP source port value "35200" does not fall within its forwarding range ("49152-65535") and will block information in its copy of the second VxLAN data packet from being transmitted to the edge device 212 as indicated by element 614.

Figure 6E:
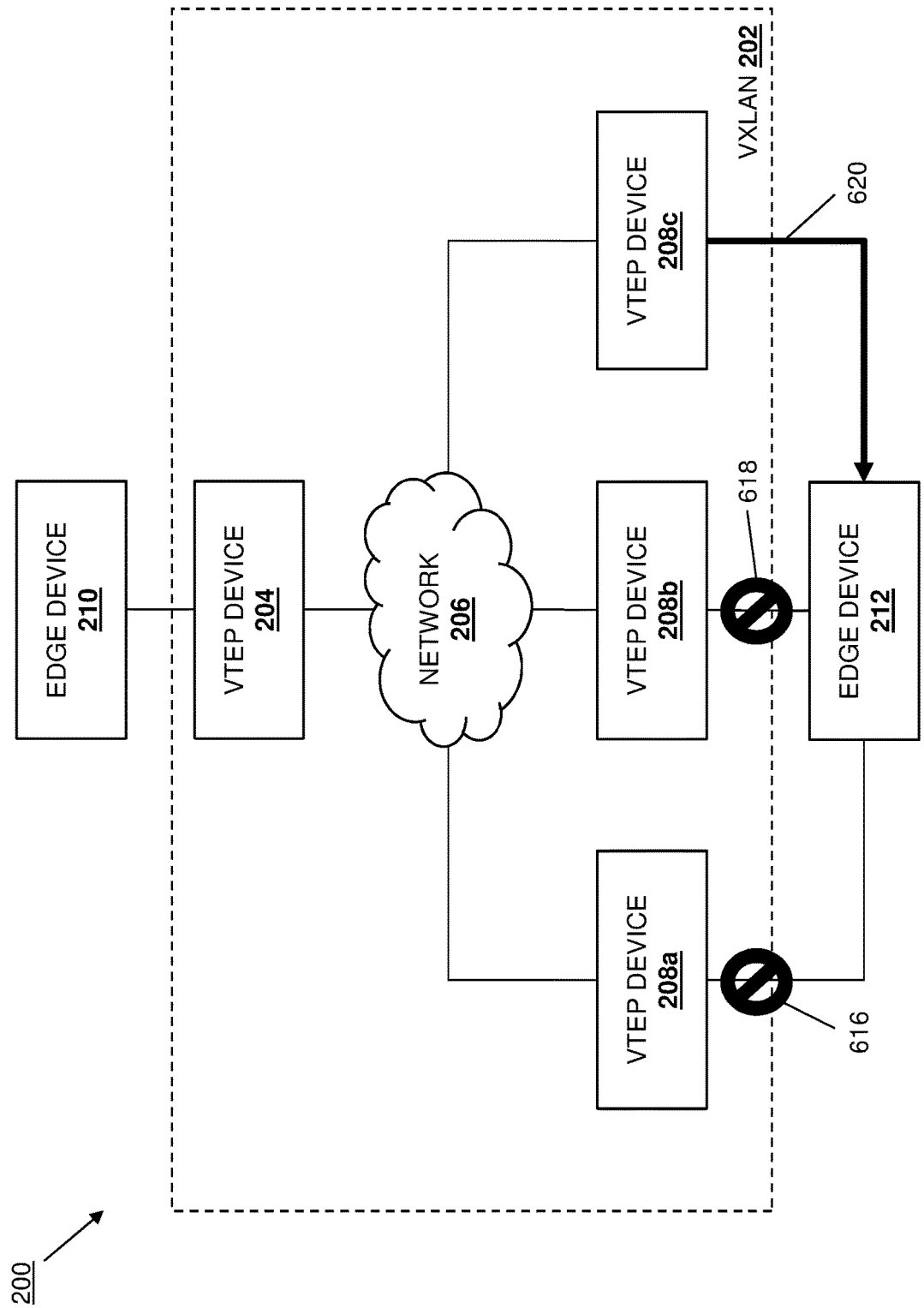
FIG. 6E is a schematic view illustrating an embodiment of the transmission of data traffic in the multi-homed edge device VxLAN data traffic forwarding system of FIG. 2 during the method of FIG. 4.

With reference to FIG. 6E, and based on the forwarding ranges included in the table provided in the example above, the UDP source port value that was provided by the VTEP device 202 in the UDP source port field 506b included in the UDP information 506a of the UDP header 506 in each of the copies of a third VxLAN data packet 500 may be "61524". As such, the forwarding engine 304 in the VTEP device 208a will determine that the UDP source port value "61524" does not fall within its forwarding range ("0-24575") and will block information in its copy of the third VxLAN data packet from being transmitted to the edge device 212 as indicated by element 616, while the forwarding engine 304 in the VTEP device 208b will determine that the UDP source port value "61524" does not within its forwarding range ("24576-49151") and will block information in its copy of the third VxLAN data packet from being transmitted to the edge device 212 as indicated by element 618, and the forwarding engine 304 in the VTEP device 208c will determine that the UDP source port value "61524" falls within its forwarding range ("49152-65535") and will forward information in its copy of the third VxLAN data packet to the edge device 212 as indicated by element 620.

Thus, systems and methods have been described that provide for the forwarding of one of a plurality of copies of any particular VxLAN data packet to an edge device over time using different multi-homed VTEP devices that are provided in a multi-homed configuration with the edge device. A source VTEP encapsulates an Ethernet data packet in a VxLAN data packet and performs a hashing operation on information included in the Ethernet data packet (e.g., the inner packet information provided by the Ethernet data packet) in order to generate a hashed value, and then provides that hashed value as a UDP source port value in a UDP source port field of a UDP header in the VxLAN data packet. The source VTEP forwards multiple copies of that VxLAN packet through a network to each of the multi-homed VTEP devices, and each of the multi-homed VTEP devices will compare the UDP source port value to a forwarding range for that multi-homed VTEP device that is different than respective forwarding ranges for the other multi-homed VTEP devices (e.g., each multi-homed VTEP device may have a forwarding range that is a potion of the range of UDP source port values available for the UDP source port field in the UDP header), and determine whether that UDP source port value falls within its forwarding range. If so, that VTEP device will forward information in that VxLAN data packet to the edge device in the multi-homed configuration and, if not, that VTEP device will block information in that VxLAN data packet from being forwarded to the edge device in the multi-homed configuration. As such, different VxLAN data packets generated by the source VTEP device will have different UDP source port values, which will result in different ones of the multi-homed VTEP devices forwarding a single copy of information in that VxLAN data packet to the edge device while the other multi-homed VTEP devices block information in their copies of that VxLAN data packet from being forwarding to the edge device, thus distributing the forwarding of information in VxLAN data packets to the edge device across different ones of the multi-homed VTEP devices over time. As such, bandwidth on links between the VTEP devices and edge device in the multi-homed configuration is utilized more evenly than conventional systems that elect a single VTEP device in the multi-homed configuration as a designated forwarder for forwarding VxLAN data packets to the edge device, and software overhead associated with maintaining the designated forwarder (and backup forwarder states) is eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-homed edge device Virtual Extensible Local Area Network (VxLAN) data traffic forwarding system, comprising:

a first edge device;
a second edge device;
a first Virtual Extensible Local Area Network (VxLAN) Tunnel EndPoint (VTEP) device that is coupled to the first edge device and a network, wherein the first VTEP device is configured to:
  receive an Ethernet data packet from the first edge device;
  encapsulate the Ethernet data packet in a VxLAN data packet;
  generate a source port value using information included in the Ethernet data packet;
  provide the source port value in a source port field in the VxLAN data packet; and
  transmit multiple copies of the VxLAN data packet through the network; and
a plurality of second VTEP devices that are coupled to the first VTEP device and the second edge device, wherein each of the plurality of second VTEP devices is configured to:
  receive, through the network from the first VTEP device, a copy of the VxLAN data packet;
  determine whether the source port value in the source port field in that copy of the VxLAN data packet is included in a forwarding range for that second VTEP device that is different than at least one respective forwarding range for each of the other respective second VTEP devices;
  prevent, in response to the source port value in the source port field in that copy of the VxLAN data packet not being included in the forwarding range for that second VTEP device, information in that copy of the VxLAN data packet from being transmitted to the second edge device; and
  transmit, in response to the source port value in the source port field in that copy of the VxLAN data packet being included in the forwarding range for that second VTEP device, information in that copy of the VxLAN data packet to the second edge device.

2. The system of claim 1, wherein the source port value in the source port field in the VxLAN data packet is a User Datagram Protocol (UDP) source port value in a UDP source port field of a UDP header included in the VxLAN data packet.

3. The system of claim 1, wherein the source port value is generated via a hashing operation performed on at least some of the information included in the Ethernet data packet.

4. The system of claim 1, wherein each of the plurality of second VTEP devices is configured to:
  generate a first edge device connection communication;
  transmit, through the network, the first edge device connection communication;
  receive, through the network each of the other second VTEP devices, a respective second edge device connection communication; and
  determine, based on information included the first edge device connection communication and the second edge device connection communication, that each of the plurality of second VTEP devices are connected to the second edge device.

5. The system of claim 1, wherein the plurality of second VTEP devices are configured to divide a source port value range available for the source port field between the plurality of second VTEP devices in order to provide the different forwarding ranges for each respective second VTEP device.

6. The system of claim 1, wherein each of the plurality of second VTEP devices is configured to:
  receive, through the network from the first VTEP device, the copy of the VxLAN data packet;
  determine whether the sum of the source port value in the source port field and a virtual network identifier in that copy of the VxLAN data packet is included in the forwarding range for that second VTEP device that is different than at least one respective forwarding range for each of the other second VTEP devices;
  prevent, in response to the sum of the source port value in the source port field and the virtual network identifier in that copy of the VxLAN data packet not being included in the forwarding range for that second VTEP device, information in that copy of the VxLAN data packet from being transmitted to the second edge device; and
  transmit, in response to the sum of the source port value in the source port field and a virtual network identifier in that copy of the VxLAN data packet being included in the forwarding range for that second VTEP device, information in that copy of the VxLAN data packet to the second edge device.

7. An Information Handling System (IHS), comprising:
a processing system; and
a memory system that is coupled to the processing system and that includes instructions that, when executed by the processing system, cause the processing system to provide a forwarding engine that is configured to:
  receive, through a network from a first Virtual Extensible Local Area Network (VxLAN) Tunnel EndPoint (VTEP) device, a copy of a VxLAN data packet that encapsulates an Ethernet data packet and includes a source port field having a source port value that was generated using information in the Ethernet data packet;
  determine whether the source port value in the source port field in the copy of the VxLAN data packet is included in a forwarding range that provides for forwarding of VxLAN data packets by the forwarding engine to an edge device, and that is different than at least one respective forwarding range that provides for forwarding of VxLAN data packets to the edge device by at least one respective second VTEP device that is coupled to the edge device;
  prevent, in response to the source port value in the source port field in the copy of the VxLAN data packet not being included in the forwarding range, information in the copy of the VxLAN data packet from being transmitted to the edge device; and
  transmit, in response to the source port value in the source port field in the copy of the VxLAN data packet being included in the forwarding range, information in the copy of the VxLAN data packet to the edge device.

8. The IHS of claim 7, wherein the source port value in the source port field in the VxLAN data packet is a User Datagram Protocol (UDP) source port value in a UDP source port field of a UDP header included in the VxLAN data packet.

9. The IHS of claim 7, wherein the source port value is generated via a hashing operation performed on at least some of the information included in the Ethernet data packet.

10. The IHS of claim 7, wherein the forwarding engine is configured to:
  generate a first edge device connection communication;

transmit, through the network, the first edge device connection communication;
receive, through the network each at least one respective second VTEP device, a respective second edge device connection communication; and
determine, based on information included the first edge device connection communication and the second edge device connection communication, that each of the at least one second VTEP device and the forwarding engine are connected to the edge device.

11. The IHS of claim 7, wherein the forwarding engine and the at least one second VTEP device are configured to divide a source port value range available for the source port field between the forwarding engine and the at least one second VTEP device in order to provide the different forwarding ranges for the forwarding engine and each at least one respective second VTEP device.

12. The IHS of claim 7, wherein the forwarding engine is configured to:
receive, through a network from the first VTEP device, the copy of the VxLAN data packet;
determine whether the sum of the source port value in the source port field and a virtual network identifier in the copy of the VxLAN data packet is included in a forwarding range that provides for forwarding of VxLAN data packets by the forwarding engine to the edge device, and that is different than the at least one respective forwarding range that provides for forwarding of VxLAN data packets to the edge device by the at least one respective second VTEP device that is coupled to the edge device;
prevent, in response to the sum of the source port value in the source port field and the virtual network identifier in the copy of the VxLAN data packet not being included in the forwarding range, information in the copy of the VxLAN data packet from being transmitted to the edge device; and
transmit, in response to the sum of the source port value in the source port field and the virtual network identifier in the copy of the VxLAN data packet being included in the forwarding range, information in the copy of the VxLAN data packet to the edge device.

13. The IHS of claim 7, wherein VxLAN data packet is provided as a broadcast data packet, an unknown unicast data packet, and a multicast data packet.

14. A method for forwarding Virtual Extensible Local Area Network (VxLAN) VxLAN traffic to a multi-homed edge device in a VxLAN, comprising:
receiving, by a first VxLAN Tunnel Endpoint (VTEP) device through a network from a second VTEP device, a copy of a VxLAN data packet that encapsulates an Ethernet data packet and includes a source port field having a source port value that was generated using information in the Ethernet data packet;
determining, by the first VTEP device, whether the source port value in the source port field in the copy of the VxLAN data packet is included in a forwarding range that provides for forwarding of VxLAN data packets by the first VTEP device to an edge device, and that is different than at least one respective forwarding range that provides for forwarding of VxLAN data packets to the edge device by at least one respective third VTEP device that is coupled to the edge device;
preventing, by the first VTEP device in response to the source port value in the source port field in the copy of the VxLAN data packet not being included in the forwarding range, information in the copy of the VxLAN data packet from being transmitted to the edge device; and
transmitting, by the first VTEP device in response to the source port value in the source port field in the copy of the VxLAN data packet being included in the forwarding range, information in the copy of the VxLAN data packet to the edge device.

15. The method of claim 14, wherein the source port value in the source port field in the VxLAN data packet is a User Datagram Protocol (UDP) source port value in a UDP source port field of a UDP header included in the VxLAN data packet.

16. The method of claim 14, wherein the source port value is generated via a hashing operation performed on at least some of the information included in the Ethernet data packet.

17. The method of claim 14, further comprising:
generating, by the first VTEP device, a first edge device connection communication;
transmitting, by the first VTEP device through the network, the first edge device connection communication;
receiving, by the first VTEP device through the network to each of the at least one third VTEP device, a respective second edge device connection communication; and
determining, by the first VTEP device based on information included the first edge device connection communication and the second edge device connection communication, that each of the at least one third VTEP device and the first VTEP device are connected to the edge device.

18. The method of claim 14, further comprising:
dividing, by the first VTEP device in cooperation with the at least one third VTEP device, a source port value range available for the source port field between the first VTEP device and the at least one third VTEP device in order to provide the different forwarding ranges for the first VTEP device and each of the at least one respective third VTEP device.

19. The method of claim 14, further comprising:
receiving, by the first VTEP device through the network from the second VTEP device, the copy of the VxLAN data packet;
determining, by the first VTEP device, whether the sum of the source port value in the source port field and a virtual network identifier in the copy of the VxLAN data packet is included in a forwarding range that provides for forwarding of VxLAN data packets by the first VTEP device to the edge device, and that is different than the at least one respective forwarding range that provides for forwarding of VxLAN data packets to the edge device by the at least one third VTEP device that is coupled to the edge device;
preventing, by the first VTEP device in response to the sum of the source port value in the source port field and the virtual network identifier in the copy of the VxLAN data packet not being included in the forwarding range, information in the copy of the VxLAN data packet from being transmitted to the edge device; and
transmitting, by the first VTEP device in response to the sum of the source port value in the source port field and the virtual network identifier in the copy of the VxLAN data packet being included in the forwarding range, information in the copy of the VxLAN data packet to the edge device.

20. The method of claim 14, wherein VxLAN data packet is provided as a broadcast data packet, an unknown unicast data packet, and a multicast data packet.

\* \* \* \* \*